(12) United States Patent
Squillace

(10) Patent No.: US 8,448,142 B2
(45) Date of Patent: May 21, 2013

(54) INCREMENTAL RUNTIME COMPLIANCE VALIDATION OF RENDERABLE OBJECTS

(75) Inventor: Michael A. Squillace, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 909 days.

(21) Appl. No.: 12/546,984

(22) Filed: Aug. 25, 2009

(65) Prior Publication Data

US 2011/0055815 A1    Mar. 3, 2011

(51) Int. Cl.
  *G06F 9/44*    (2006.01)
(52) U.S. Cl.
  USPC ......................................................... 717/125
(58) Field of Classification Search
  None
  See application file for complete search history.

(56) References Cited

U.S. PATENT DOCUMENTS

| | | | |
|---|---|---|---|
| 7,610,256 B1 * | 10/2009 | Yang | 706/52 |
| 2002/0111963 A1 * | 8/2002 | Gebert et al. | 707/513 |
| 2004/0031019 A1 | 2/2004 | Lamanna et al. | |
| 2004/0230954 A1 | 11/2004 | Dandoy | |
| 2009/0217302 A1 * | 8/2009 | Grechanik et al. | 719/320 |
| 2009/0228838 A1 * | 9/2009 | Ryan et al. | 715/853 |

* cited by examiner

*Primary Examiner* — Philip Wang

(74) *Attorney, Agent, or Firm* — Stephen J. Walder, Jr.; Eustus D. Nelson

(57) ABSTRACT

Mechanisms are provided for debugging a graphical user interface (GUI) of a computer application code. The mechanisms detect a user interaction with a first renderable object of the GUI during execution of the computer application code. The mechanisms identify one or more second renderable objects of the GUI that are reachable from the first renderable object based on an identity of the first renderable object and a type of the user interaction. Moreover, the mechanisms apply one or more compliance rules to the first renderable object and one or more second renderable objects, the compliance rules specifying requirements for at least one relationship between the first renderable object and the one or more second renderable objects. Additionally, the mechanisms output results of the application of the one or more compliance rules to the first renderable object and one or more second renderable objects.

18 Claims, 3 Drawing Sheets

INCREMENTAL RUNTIME COMPLIANCE VALIDATION OF RENDERABLE OBJECTS

BACKGROUND

The present application relates generally to an improved data processing apparatus and method and more specifically to mechanisms for incremental runtime compliance validation of renderable objects.

Most commonly used integrated development environments (IDEs) today have a debugging infrastructure. The debugging infrastructure, or "debugger," allows the developer to incrementally study a running program by examining its components at runtime by inspecting elements of those components at specified points of execution. Such elements include variables and their values, the runtime stack, flow control analysis, thread states, and other low-level features of the running application's modules. In object-oriented languages, such as Java™, available from Sun Microsystems, debuggers also reveal the internal data structure of runtime objects, values of their data members, and insights into the polymorphic behavior of runtime objects.

Thus, debuggers are quite sufficient for low-level testing of business logic or the flow of standard processing. However, debuggers typically do not provide support for analyzing higher-level components at runtime, i.e. the types of components that are, for example, the constituents of a graphical user interface (GUI). For instances, debuggers cannot reveal anything about a component's relationship to other components in the GUI hierarchy or the extent to which a component, at a given instance, complies with certain criteria as a developer steps through the code that creates, configures, and reveals that component. In other words, incremental analysis of a richer set of features or properties germane to GUI components is missing from modern-day debuggers.

SUMMARY

In one illustrative embodiment, a method, in a data processing system, is provided for debugging a graphical user interface (GUI) of a computer application code. The method comprises detecting, by a debug agent running on a computing device associated with the data processing system, a user interaction with a first renderable object of the GUI during execution of the computer application code. The method further comprises identifying, by a user interface debugger running on the data processing system, one or more second renderable objects of the GUI that are reachable from the first renderable object based on an identity of the first renderable object and a type of the user interaction. Moreover, the method comprises applying, by the user interface debugger, one or more compliance rules to the first renderable object and one or more second renderable objects, the compliance rules specifying requirements for at least one relationship between the first renderable object and the one or more second renderable objects. Additionally, the method comprises outputting, by the user interface debugger, results of the application of the one or more compliance rules to the first renderable object and one or more second renderable objects.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
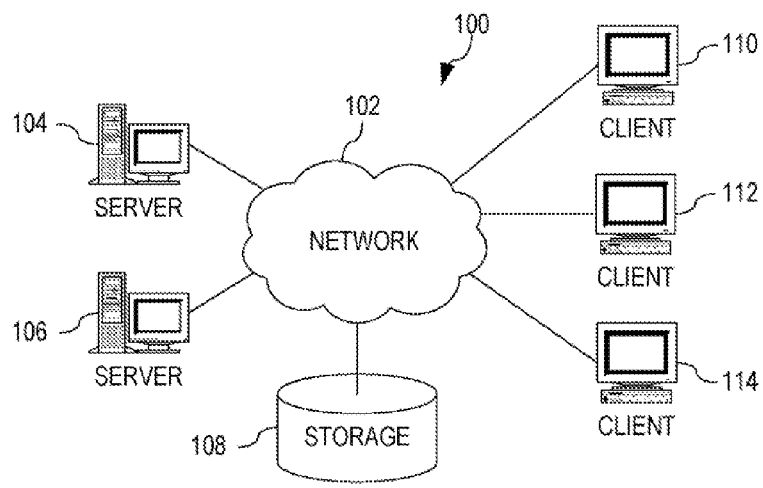
FIG. 1 is a pictorial representation of an example distributed data processing system in which aspects of the illustrative embodiments may be implemented.

The illustrative embodiments provide mechanisms for incremental runtime compliance validation of renderable objects, i.e. objects that are able to be rendered in a visual manner via a computing device's display. The illustrative embodiments provide high-level debugger mechanisms to incrementally study and evaluate the complex states of, and relations between, runtime objects such as graphical user interface (GUI) components. The illustrative embodiments incrementally analyze the state of rendered objects both prior to and after these objects are rendered, and as code effecting the creation, modification, appearance, and/or behavior of these objects while executing, is executed.

In particular, some illustrative embodiments are interested in the extent to which these rendered objects comply with user-specified rules or criteria as code is incrementally executed. In this way, software developers are able to perceive the compliance violations that exist at any particular time of execution, rather than only after a formal validation is performed. This aids in correcting the compliance violations in a manner similar to the way in which viewing the flow control or value of a variable may aid in correcting runtime errors that cannot be detected during normal execution of the application.

The illustrative embodiments utilize an integrated development environment (IDE) that provides a debugging infrastructure, or "debugger," access to a structured representation of the source code, such as an abstract syntax tree (AST) or document object model (DOM), and a configurable compliance validation engine. In one illustrative embodiment, prior to, or during, the execution of an application, breakpoints are set at points of interest in the code using the existing debugging infrastructure. Upon reaching a breakpoint, the illustrative embodiments determine the renderable objects within the current scope, i.e. renderable objects that are reachable within the code from a current point in the execution of the application at the time of the breakpoint.

Which objects are renderable will be dependent upon the graphical user interface (GUI) toolkit or framework being used. For instance, at a particular breakpoint, it may be determined that any instance of javax.swing.JComponent in the Java Swing GUI toolkit can be effectively rendered at this point in the execution of the application, whereas only certain types of document elements within a HyperText Markup Language (HTML) document can be rendered. The structured model for the source code and components of the debugging infrastructure determine the objects within the current scope and the types of these objects.

Once the renderable objects in the current scope have been identified, the illustrative embodiments determine the validation rules, if any, that apply to these renderable objects and then perform validation on the objects. As the user steps through code, renderable objects are revalidated, showing how compliance is demonstrated, or not demonstrated, at each step in the executing program.

The illustrative embodiments focus upon studying the incremental compliance of renderable objects, e.g., GUI components, as a developer steps through executing code. For example, a breakpoint may be set in a portion of code in which a button GUI component is created by that portion of code. As the developer steps line-by-line through the code, the information from the integrated development environment (IDE) debugger is used to gather together which renderable objects, i.e. GUI components, are to be validated based on the rules specified. Such rules may be specified in any of a number of different ways, such as through an extensible markup language (XML) document, in a programming language such as Java™, a simple text file, or the like.

For example, upon the instantiation of a button GUI component, the setting of its properties, and the firing of its events, the button (and possibly other renderable objects within the current execution stack and targeted by the rules) are re-evaluated for compliance. Compliance may be measured in terms of many different concepts that are articulated as rules in a validation document, file, or the like, such as an XML document, Java program file, text file, or the like, as mentioned above. For example, compliance may be measured by rules specifying accessibility of the GUI component and other components reachable from that GUI component. Other rules may be written to articulate a corporation's privacy policy, branding mechanisms (e.g., placement of logos and templates), etc.

This differs from prior art debugging mechanisms since the illustrative embodiments are debugging the code based on evaluations of relationships between renderable objects, e.g., GUI components, and not simply outputting properties of objects. The debugging of the illustrative embodiments is not simply interested in what the properties are of a GUI component or other renderable object, but how these properties work together and with other GUI components/renderable objects to make the GUI component/renderable object compliant or non-compliant.

Moreover, the evaluations are performed upon the occurrence of each event associated with the renderable objects without having to insert a breakpoint in the code to achieve such evaluation (although the illustrative embodiments may be used with inserted breakpoints or may insert breakpoints into the code dynamically). Traditional debuggers merely gather debug information, and/or display this information to a developer, at explicitly specified breakpoints inserted into the code itself that force the execution of the code to be halted and branched to the debugger. With the mechanisms of the illustrative embodiments, the debugging is performed essentially in parallel with the execution of the code such that, as events occur and interactions between GUI components occur, these interactions and events are checked for compliance with established compliance or validation rules to determine if a break in execution should be generated and an evaluation of the relationship between GUI components evaluated.

Furthermore, in traditional debuggers, breakpoints (which are the points in the code where execution of the code is transferred to a debugger for gathering of debug information) must be set by the developer based on either the line number or simple Boolean conditions (conditional breakpoints). This forces the developer to have knowledge of where violations might take place in the code and insert breakpoints in these locations. To the contrary, with the mechanisms of the illustrative embodiments, breakpoints may be set based upon when a particular validation rule fails. That is, in response to a validation rule failing, a break in the execution of the code is triggered, even though a formal breakpoint has not been inserted into the code itself, and debug information may be generated for this dynamically generated breakpoint such that the developer is, in a sense, placed squarely in the execution of the application at the point at which compliance is most likely an issue.

For example, a developer may not have any knowledge of where in the code that code for handling a particular GUI component event is present or how that event handling code is structured, which may be the case in the ever increasing code size of today's computer programs. However, the developer may establish a rule in the validation document that is then conveyed to the debugger which identifies at least one condition under which a break in execution is to be made. For example, the rule may specify that a break in execution is to be performed by the debugger when a right arrow key is pressed and the state of a corresponding menu tree GUI component is not expanded. In such a case, the break may be performed in response to this condition occurring in which case the break is generated in the portion of code where the right arrow key event was detected and the corresponding event handling code of the program did not result in an expansion of the menu tree GUI component. Thus, the developer is brought directly to the portion of code that is most likely a cause of a compliance violation.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
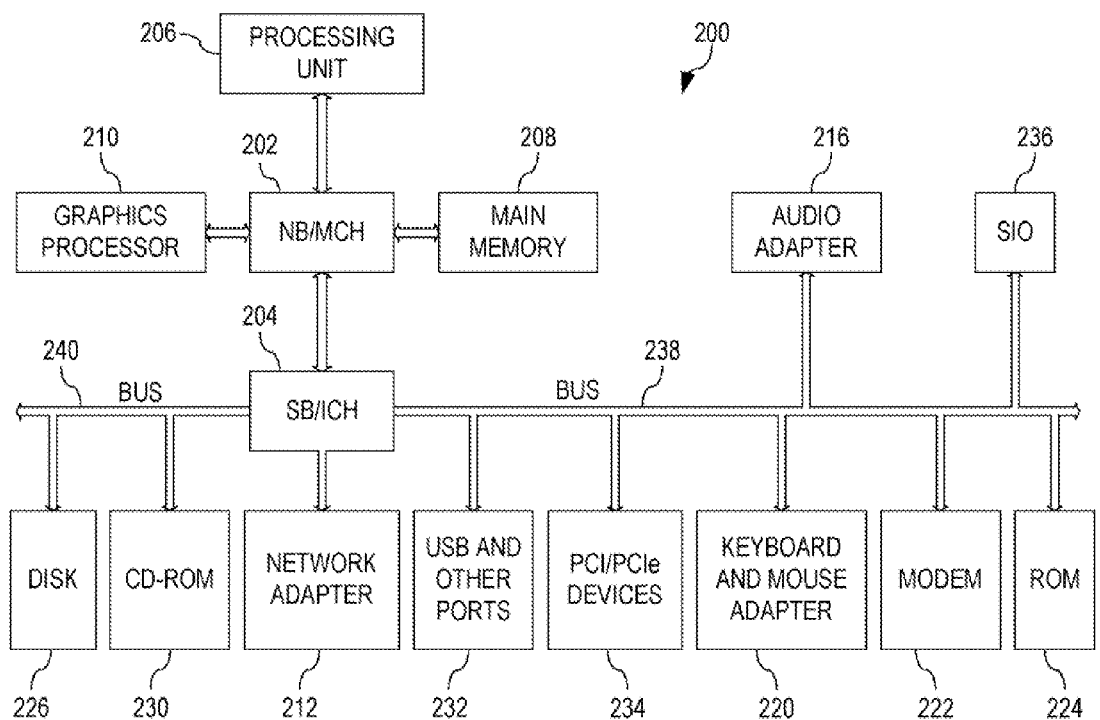
FIG. 2 is an example block diagram of an example data processing device or system in which aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The mechanisms of the illustrative embodiments may be implemented, for example, in one or more of a server computing device, such as servers 104 or 106 in FIG. 1, or a client computing device, such as clients 110, 112, and 114 in FIG. 1. In some illustrative embodiments, a user, such as a developer of computer code, may interact with the mechanisms of the illustrative embodiments using a client computing device, e.g., one of clients 110, 112, or 114 in FIG. 1, which communicates with a server computing device, e.g., server 104, which runs the debugging and compliance validation mechanisms of the illustrative embodiments.

Figure 3:
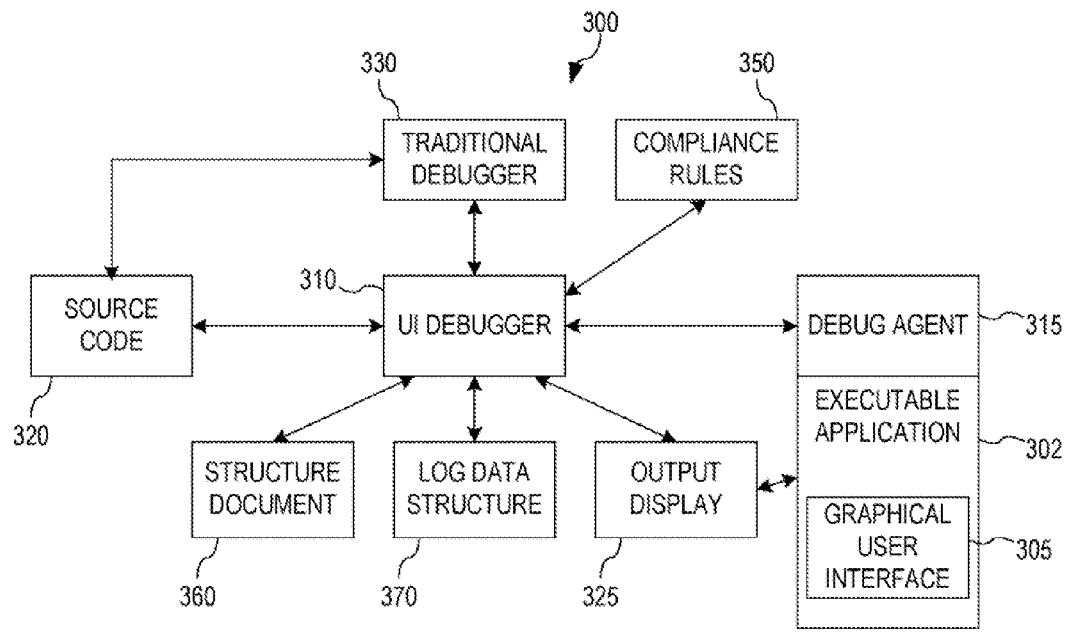
FIG. 3 is an example block diagram of the primary operational elements of an incremental runtime compliance validation engine in accordance with one illustrative embodiment.

FIG. 3 is an example block diagram of the primary operational elements of an incremental runtime compliance validation engine in accordance with one illustrative embodiment. As shown in FIG. 3, the incremental runtime compliance validation engine or system 300 is used to debug and validate the operation of an executable software application 302 and, in particular, its graphical user interface 305, with regard to defined compliance rules 350. Compliance may be measured in terms of many different concepts that are articulated as compliance rules 350 in a validation document, file, or the like, such as an XML document, Java program file, text file, or the like, as mentioned above. For example, compliance may be measured by rules specifying accessibility of the GUI component and other components reachable from that GUI component. Other rules may be written to articulate a corporation's privacy policy, branding mechanisms (e.g., placement of logos and templates), etc.

The incremental runtime compliance validation engine/system 300 may be part of an integrated development environment (IDE), for example, which provides comprehensive tools for the development, testing, and debugging of computer programs. The engine/system 300 includes a user interface (UI) debugger 310 and a debug agent 315 which, in one form, can both be embodied as software. The UI debugger 310 is configured to monitor a user's interactions with regard to the graphical user interface 305 of the executable software application 302. In particular, the UI debugger 310 monitors the user's interaction, i.e. the events generated as part of the user's interaction with the graphical user interface (GUI) elements, e.g., buttons, drop down menu elements, hyperlinks, etc., and as these events occur.

In response to user's interactions with GUI components and renderable objects within the GUI, the UI debugger 310 determines the renderable objects within the scope of the current operation being performed based on the user input, e.g., the current scope of renderable objects reachable from the renderable object in the GUI with which the user is presently interacting. The determination of the current scope of renderable objects may be performed, for example, by the UI debugger 310 analyzing a structure document 360 or other representation of the structure of the computer program. This structure document 360 may be, for example, a document object model (DOM), abstract syntax tree (AST), or the like. For example, a current node in the AST that is associated with the GUI component or renderable object with which the user is interacting and, based on the operation being performed, the renderable objects identified as being reachable through a branch of the AST corresponding to that renderable object and operation may be determined. The identity of these reachable renderable objects may then be returned for use in determining compliance with established compliance rules.

The UI debugger 310, with the assistance of the traditional debugger 330, gathers information about the various renderable objects within the present scope and compares the gathered information with one or more compliance rules 350 that are configured to determine compliance with an established standard. The one or more compliance rules 350 look at inter-relationships between the renderable objects and not just individual parameters of the renderable objects, although verifying that individual parameters meet requirements may be performed as well. For example, the one or more compliance rules 350 may define an accessibility requirement by specifying that when the GUI component the user is interacting with receives a user selection, a particular other GUI component is highlighted and a screen reader reads the text of the other GUI component. Thus, the UI debugger 310 gathers state information for the various renderable objects within the present scope and applies one or more compliance rules 350 to verify that relationships between the states of a current renderable object that is being interacted with by a user, and one or more other renderable objects within the present scope. The one or more compliance rules 350 may specify, for example, a required relationship between the current renderable object and the one or more other renderable objects within the present scope with regard to operations performed by, and state of, the one or more other renderable objects in response to the type of the user interaction being performed on the current renderable object.

It is important to note that the UI debugger 310 operates continuously as the user interacts with the GUI components and renderable objects are generated by the computer code executing in the data processing system. Thus, each time the user interacts with a GUI component or renderable object, the interaction is processed by determining renderable objects within the current scope of the interaction and validates the GUI component and renderable objects with regard to compliance rules. In the event that a compliance rule is violated by the GUI component or the renderable objects, a log of the violation may be generated, a violation message may be displayed to the user, e.g., a developer of the computer code, etc. Moreover, a break in the execution of the computer program code may be dynamically performed and the current location in the computer program code, and/or the portion of computer program code generating the violation, may be output to the user/developer. The user/developer is thus, dynamically brought directly to the source of the compliance violation upon the detection of the violation as the user is interacting with the GUI components and renderable objects.

The debug agent 315 includes computer-executable instructions that are configured to be embedded or otherwise combined with the executable application 302. The debug agent 315 is further configured to collect execution data relating to the graphical user interface 305 during run-time. Examples of execution data include object properties, events associated with objects, run-time states of the application 302, such as the executable stack of the computer program, and/or other desired runtime data. The execution data can be obtained, for example, by reading state values stored in memory that are maintained for the application during execution. The debug agent 315 is further configured to communicate the collected execution data to the UI debugger 310. In general, the debug agent 315 functions as monitoring software but can also be configured to interact with the application 302 and change runtime values of objects as described below.

In some illustrative embodiments, the debugging system 300 may be configured for remote debugging in which the user interface debugger 310 may be configured to execute on a first computer while the application 302 may be executed on a second computer. Since the UI debugger 310 is on a separate machine in such an embodiment, the UI debugger 310 cannot directly make requests to the operating system of the second computer in order to receive data. Instead, the debug agent 315 is configured to be combined with the application 302 such that the debug agent 315 can communicate with the operating system involved in the execution of the application

302. The UI debugger 310 and the debug agent 315 may then be configured to communicate to each other through a communication channel such as a TCP/IP socket connection. In this manner, the debug agent 315 functions as "spy software" for the UI debugger 310.

In another embodiment, the UI debugger 310 may be configured to execute on the same computer as the executing application 302. For example, if using a Java-based system, the application 302, the debug agent 315, and UI debugger 310 may be run in a common process as part of a virtual machine that can execute Java instructions, or can be run in separate processes. Both in local and remote debugging, the UI debugger 310 and the debug agent 315 may use TCP/IP, or another network protocol, to communicate. One difference between the local and remote illustrative embodiments is that in local debugging, the debugger 310 can start the application 302 (including the debug agent 315), while in remote debugging, it may be the responsibility of a user to start the application 302.

In one illustrative embodiment, the debug agent 315 is embedded into the application 302. If the software is programmed in Java™, for example, compiled software has an assigned entry point that indicates where the software is to begin execution. In one illustrative embodiment, the UI debugger 310 is configured to programmatically change the entry point of the application 302 to point to the entry point of the debug agent 315. The debug agent 315 is then configured to call or otherwise initiate the application 302 by pointing to the original entry point of the application 302. In this manner, before the application 302 begins execution, the code of the debug agent 315 is executed where it initially configures itself to record execution data, communicate with the application 302, and establish a communication channel with the UI debugger 310.

For example, the agent 315 can request the application 302 to draw a logical representation of itself into memory as a tree structure. Alternatively, the tree structure may be provided by a developer as a separate structure from the computer program. The debug agent 315 can also maintain memory references to objects in the tree structure and maintain associations between the object in memory and to the application 302. The tree hierarchical structure, e.g., an abstract syntax tree (AST) or document object model (DOM), of the application can then be communicated to the UI debugger 310 so that the UI debugger 310 has knowledge of the tree hierarchical structure. For example, the tree hierarchical structure may be stored as the structured document 360 for use by the UI debugger 310. By embedding the debug agent 315, it can run in parallel with the application 302 and it can monitor states of the application 302 including the states of objects in the user interface 305. As such, the debug agent 315 can act on the application 302 and can programmatically request the application for its state, its structure, or other information. In this manner, the debug agent 315 can receive image information and properties of objects within the graphical user interface 305 that may be useful to a user while debugging. In this manner, the debug agent 315 is configured to take a snap-shot of current state information of the graphical user interface 305 and provide the state information to the UI debugger 310. The UI debugger 310 can then be configured to generate a graphical state that re-creates the user interface 305 based on the current state information. In another embodiment, the debug agent 115 can be configured to store the state information in a file or other data structure, such as a debug log, for subsequent use rather than communicating the information directly to the UI debugger 310. In this manner, the debug agent 315 may be configured to exist and operate separate from the UI debugger 310.

The UI debugger 310 may further be configured to associate selected objects from the graphical user interface 305 to its corresponding source code 320, which may include code that will be activated (e.g. executed) in response to an image object being selected. The source code 320 is the source code file that corresponds to the executable version of the application 302. By determining the hierarchy of objects (such as by using the tree hierarchical structure specified in the structure document 360) and where their definitions are, the UI debugger 310 can create a mapping between object images from the user interface 305 and the source code 320. For example, if an object is found to be of type "javax.swing.JButton", the UI debugger 310 can be configured to search in one or more source paths for a file called ". . . .backslash.javax.backslash..swing.backslash.JButton.—java." The source paths can be defined by a user, by defaults, or combinations of both. A source path is a list of directories (or zip files) under which the source files are found. The relationship between class names (dot separated) and the source file name is defined by Java. In other languages, this mapping can be built by the compiler into a debugging support file. The debug agent 315 can be configured to map objects from the user interface 305 with in-memory objects that can then be displayed, for example, by a traditional debugger 330.

In another embodiment, the UI debugger 310 can further include logic such that it is interactive with a user. For example, the logic can include a user interface that displays execution data 325 received from the debug agent 315 and that can receive debugging requests from the user. Examples of debugging requests may include selecting an object from the graphical user interface 305 and requesting its properties, its hierarchical status, and associated source code. Other debugging requests may include a request to monitor events associated with an object such as events occurring on the object, actions performed on the object when it is clicked, to show listeners, such as code that is listening for that event, request to hide or show an object or, requests to show other types of relationships of an object in the application 302 to its source code 320.

In this regard, the debug agent 315 may be configured to receive debugging requests from the UI debugger 310 and process them with the application 302 during run-time. The debug agent 315 can include logic configured to change properties of objects that are generated by the software application 302 during run-time in response to a debugging request from the UI debugger 310. For example, if a user wishes to hide a selected window from the graphical user interface 305, a request can be entered to the UI debugger 310 which is then communicated to the debug agent 315. The debug agent 315 in turn can determine the current state of the selected window and change its properties such that the window is hidden.

By communicating with the executing application 302, such as through reflection, the debug agent 315 can dynamically recognize properties of an object and determine events that the object can emit. As such, the debug agent 315 can be configured to observe a selected object and listen for those events. When an event is received, the debug agent 315 can determine the properties of the event and communicate those properties back to the UI debugger 310. In a remote debugging embodiment as described previously, data from the debug agent 315 can be serialized and transmitted through the socket connection to the UI debugger 310.

As mentioned above, the UI debugger 310, with the aid of the debug agent 315, is able to dynamically monitor the user's interactions with GUI components and renderable objects within the GUI 305 of the executable application 302. The UI debugger 310 thus operates dynamically as the executable application 302 is executing, based on events monitored by the debug agent 315. In particular, the debug agent 315 is configured to detect each user interaction with a GUI component or renderable object, or at least a subset of possible user interactions with GUI components/objects that are of interest to the developer, and gather information regarding the GUI component/object, the interaction performed by the user, and other parameters of the GUI components/objects, and communicate those to the UI debugger 310. Based on this information gathered and communicated by the debug agent 315, the UI debugger 310 identifies a scope of renderable objects reachable from the GUI component/object with which the user is interacting and performs compliance rule validation operations using the compliance rules 350. In the event that a compliance validation operation fails, the UI debugger 310 may communicate with the debug agent 315 to cause the debug agent 315 to halt the execution of the application 302. The point in the computer code of the application 302 where the execution is halted may be output to a display or the like such that the developer is informed of the exact place in the computer code where the compliance validation violation occurred. Moreover, the violation may be logged in a log data structure, such as log data structure 370, for further processing at a later time.

To identify the scope of the reachable GUI components/objects each time a user interaction is detected and notified to the UI debugger 310 by the debug agent 315, the UI debugger 310 accesses the structure document 360. The identity of the GUI component/object of the GUI 305 with which the user is interacting, along with the identification of the type of operation being performed by the user, e.g., a left click, a right click, a selection of a menu item, drag-and-drop, etc., may be used to identify a node or other representation in the structure document 360 corresponding to the GUI component/object and a path from that GUI component/object through the structure document 360. From the identity of the GUI component/object in the structure document and the path as determined by the type of user interaction or operation, the path through the GUI component/object may be traversed to identify reachable GUI components/objects along the path. The identities of these GUI components/objects and their corresponding properties may be used along with the compliance rules 350 to determine if any of these GUI components/objects or inter-relationships between the GUI components/objects violate any of the compliance rules 350.

As the user steps through code, renderable objects are revalidated, showing how compliance is demonstrated, or not demonstrated, at each step in the executing program. That is, each time the user interacts with a GUI component/object, other GUI components/objects that may have already been evaluated by the compliance rules 350 may be re-evaluated or revalidated. This occurs since the compliance rules 350 are configured to investigate and validate the inter-relationship between GUI components/objects rather than just instantaneous properties of the GUI components/objects. Thus, these inter-relationships may be different depending upon which GUI components/objects are involve, and current state of the execution of the computer program at that point in time, and other dynamic variables.

Thus, the illustrative embodiments focus upon studying the incremental compliance of renderable objects, e.g., GUI components, as a developer steps through executing code. In this way, software developers are able to perceive the compliance violations that exist at any particular time of execution, rather than only after a formal validation is performed. This aids in correcting the compliance violations in a manner similar to the way in which viewing the flow control or value of a variable may aid in correcting runtime errors that cannot be detected during normal execution of the application.

It should be appreciated that the UI debugger 310 can be integrated with a traditional debugger 330 that may be configured to concurrently debug the application 302. In one embodiment, the traditional debugger 330 may be a data-oriented debugger and may be configured to inspect the application 302 through its data. For example, the traditional debugger 330 may analyze in-memory data in order to find content associated with a selected object of the application 302. The UI debugger 310, on the other hand, is configured as an image-oriented debugger that inspects the application 302 through its graphical representation and the user's interaction with these graphical representations, extending to the reachable objects within the GUI 305 that may be rendered. Thus, the UI debugger 310 is configured to determine relationships between GUI components/objects within the GUI 305 at each incremental step of the execution of the application 302 as the user interacts with the GUI 305. The UI debugger 310 is further configured to perform compliance validation operations using the compliance rules 350 on these relationships.

Figure 4:
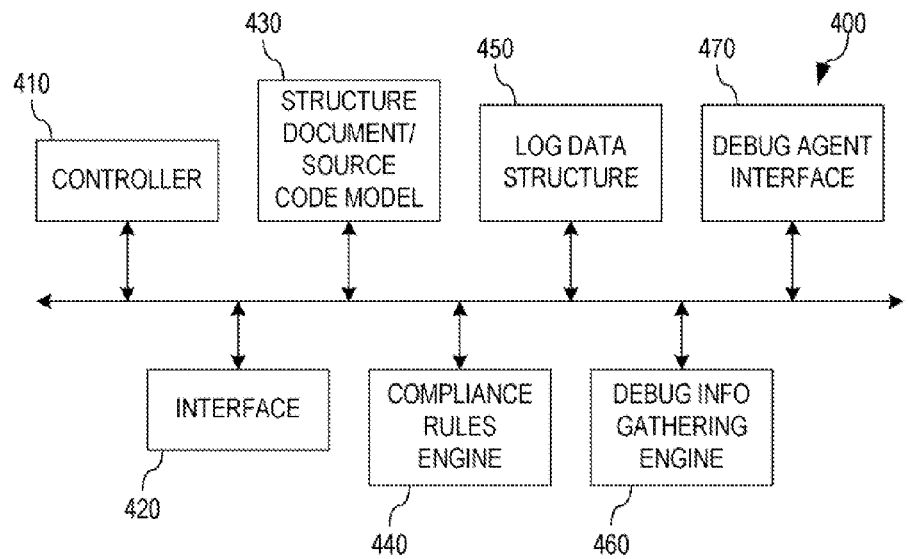
FIG. 4 is an example block diagram illustrating the primary operational components of a UI debugger, such as UI debugger 310 in FIG. 3, in accordance with one illustrative embodiment.

FIG. 4 is an example block diagram illustrating the primary operational components of a UI debugger, such as UI debugger 310 in FIG. 3, in accordance with one illustrative embodiment. The elements shown in FIG. 4 may be implemented in hardware, software, or any combination of hardware or software. In one illustrative embodiment, the elements of FIG. 4 are implemented as software executed by one or more data processing devices/systems.

As shown in FIG. 4, the UI debugger 400 comprises a controller 410, an interface 420, a structure document/source code model engine 430, a compliance rules engine 440, a log data structure 450, and debug information gathering engine 460, and debug agent interface 470. The controller 410 controls the overall operation of the UI debugger 400 and orchestrates the operation of the other elements 420-470. The interface 420 is used to receive input from a user/developer, provide output to the user/developer, and handle other types of inputs/outputs associated with the UI debugger 400 for which no other interface is provided.

The structure document/source code model engine 430 comprises logic used to generate and/or analyze a hierarchical representation of source code, such as may be presented in a document object model (DOM), abstract syntax tree (AST), or the like. For example, the structure document/source code model engine 430 may actively analyze source code and generate such a hierarchical representation or may simply be provided with the hierarchical representation of the source code and may analyze it to identify dependencies between renderable objects in a GUI associated with the source code. The structure document/source code model engine 430 may work in concert with the other elements of the UI debugger to analyze, with each user interaction with a GUI component, the scope of renderable objects and provide information about these renderable objects for use in determining compliance of the GUI with compliance rules.

The compliance rules engine 440 comprises logic which is responsible for identifying applicable compliance rules to the objects in the scope of reachable objects identified by the structure document/source code model engine 430 based on a user's interaction with a GUI component/object. The compliance rules engine 440 further applies the compliance rules to the objects in the scope of reachable objects, and determines if any of the compliance rules have been violated. Results of the application of the compliance rules may be logged in the log data structure 450. If a violation is identified, the source of the violation, i.e. the object causing the violation, may be identified by the compliance rules engine 440 and, via a correspondence between the structure document/source code model and the actual source code, the portion of the source code corresponding to the violation may be identified and output via the interface 420.

As part of determining whether the objects in the scope of reachable objects are in compliance or not, additional information may need to be gathered by the UI debugger 400 from the executing application. The debug information gathering engine 460 may gather such information utilizing a debug agent via the debug agent interface 470. For example, the debug information gathering engine 460 may gather current state information for the GUI, such as a snap-shot of state information from the executing GUI, object properties for objects in the GUI including event information, and the like. Such information may be gathered each time the debug agent communicates a new event from the GUI of the application to the UI debugger 400 via the debug agent interface 470. As mentioned above, the debug agent may be configured to monitor for events and communicate those to the UI debugger 400 as the user interacts with the GUI such that the scope of reachable objects may be determined and validated for compliance with established compliance rules.

Figure 5:
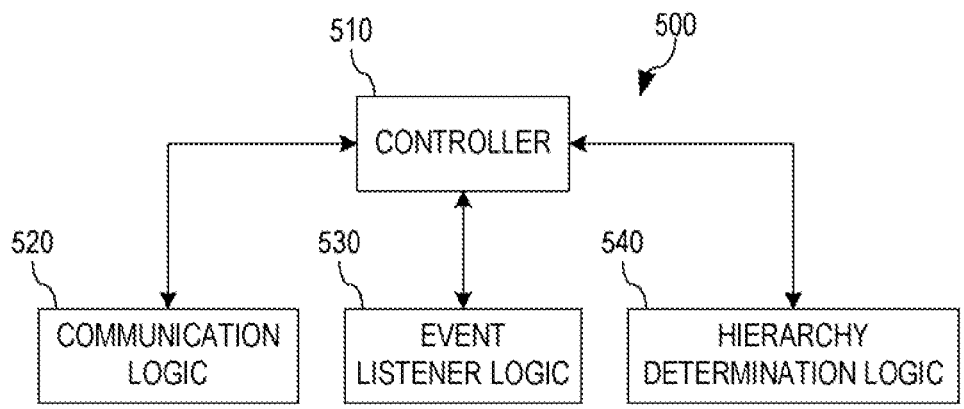
FIG. 5 is an example diagram of a debug agent 500 that may be configured to function with debugger software, such as the UI debugger 310, 400, or other illustrative embodiments.

FIG. 5 is an example diagram of a debug agent 500 that may be configured to function with debugger software, such as the UI debugger 310, 400, or other illustrative embodiments. The debug agent 500 may also be configured to operate asynchronously with a UI debugger, where the debug agent 500 collects data from an executing application and stores the data for later use by a UI debugger. The debug agent 500 includes computer-executable instructions that are configured to be embedded into a software application being debugged. It will be appreciated that embedding the debug agent 500 may include inserting or appending the agent 500 at any portion of the software application. Embedding may also include creating logical links between the debug agent 500 and software application such that they become one executable program (such as by re-assigning addresses), thereby configuring the agent 300 and the application as processes executable in parallel, or other desired configuration. In one illustrative embodiment, the debug agent 500 and the software application may be combined such that the same virtual machine or other processing device executes the combined software.

The debug agent 500 may include a controller 510 that controls the overall operation of the debug agent 500. The debug agent 500 further includes debugger communication logic 505 configured to establish and perform communication between the agent 500 and the UI debugger. In one illustrative embodiment where the debug agent 500 is remote from the UI debugger, the debugger communication logic 505 may be configured to establish a TCP/IP connection to the UI debugger through a network socket. Using the connection, the debug agent 500 may notify the UI debugger of its presence, provide required protocol numbers, establish handshaking, and otherwise communicate in accordance with the established communication protocol. Of course, other types of protocols and communication channels may be used such as infrared, Bluetooth, firewire, and other desired protocols. In another illustrative embodiment, the debug agent 500 and the UI debugger may be configured to execute on a common computer such that they may communicate between each other without a network communication channel.

The debug agent 500 may be configured with event listener logic 510. The event listener logic 510, in one embodiment, may be configured to monitor the occurrence of events that happen during run-time on one or more selected objects from the graphical user interface being debugged. The event listener logic 310 may be configured to monitor events using functions from action event listeners and focus event listeners provided by, for example, Java Swing™, HyperText Markup Language (HTML), or the like. An example of an event includes receiving input from a keyboard. In particular, with regard to the illustrative embodiments, the events are any user interaction with a GUI component/object that may be of interest to a developer. For example, the developer may instruct the UI debugger that he/she is interested in user selections of menu items in which case the UI debugger may program the debug agent to listen for events corresponding to a user selection of a menu item. Alternatively, all events caused by user interaction with GUI components may be monitored by the debug agent and used as a basis to inform the UI debugger of an event requiring compliance validation.

Optionally, the debug agent may have hierarchy determination logic 515 that is configured to determine the hierarchy of a running software application. In general, every window/dialog box or other component has a hierarchy of objects such as buttons, entry fields, panels, and other components that are behind it or on top of it. For example, the logic 515 can be configured to make requests (e.g., requests to Java Swing™ functions) to receive notification when a top level component or window is created or removed. With this information, a tree structure can be created for the top level hierarchy. The hierarchy determination logic 515 can then analyze the top level hierarchy of the user interface and determine parent-child relationships between components. In one illustrative embodiment, this can be performed by a recursive analysis on the tree structure. When a child object is found, object properties can be stored along with a reference to the child object. Object properties may include, for example, class, position, size, visibility, and/or other properties. In this way, the structure document/source code model may be generated dynamically or may be updated as the GUI components/objects are stepped through via interactions by the user.

Thus, the illustrative embodiments provide mechanisms for incremental runtime analysis of compliance of GUI components/renderable objects. The illustrative embodiments differ from prior art debugging mechanisms in that the illustrative embodiments are debugging the code based on evaluations of relationships between renderable objects, e.g., GUI components, and not simply outputting properties of objects. The debugging of the illustrative embodiments is not simply interested in what the properties are of a GUI component or other renderable object, but how these properties work together and with other GUI components/renderable objects to make the GUI component/renderable object compliant or non-compliant.

Moreover, the evaluations are performed upon the occurrence of each event associated with the renderable objects without having to insert a breakpoint in the code to achieve such evaluation (although the illustrative embodiments may be used with inserted breakpoints or may insert breakpoints into the code dynamically). Traditional debuggers merely gather debug information, and/or display this information to a developer, at explicitly specified breakpoints inserted into the code itself that force the execution of the code to be halted and branched to the debugger. With the mechanisms of the illustrative embodiments, the debugging is performed essentially in parallel with the execution of the code such that, as events occur and interactions between GUI components occur, these interactions and events are checked for compliance with established compliance or validation rules to determine if a break in execution should be generated and an evaluation of the relationship between GUI components evaluated.

Furthermore, in traditional debuggers, breakpoints (which are the points in the code where execution of the code is transferred to a debugger for gathering of debug information) must be set by the developer based on either the line number or simple Boolean conditions (conditional breakpoints). This forces the developer to have knowledge of where violations might take place in the code and insert breakpoints in these locations. To the contrary, with the mechanisms of the illustrative embodiments, breakpoints may be set based upon when a particular validation rule fails. That is, in response to a validation rule failing, a break in the execution of the code is triggered, even though a formal breakpoint has not been inserted into the code itself, and debug information may be generated for this dynamically generated breakpoint such that the developer is, in a sense, placed squarely in the execution of the application at the point at which compliance is most likely an issue.

Figure 6:
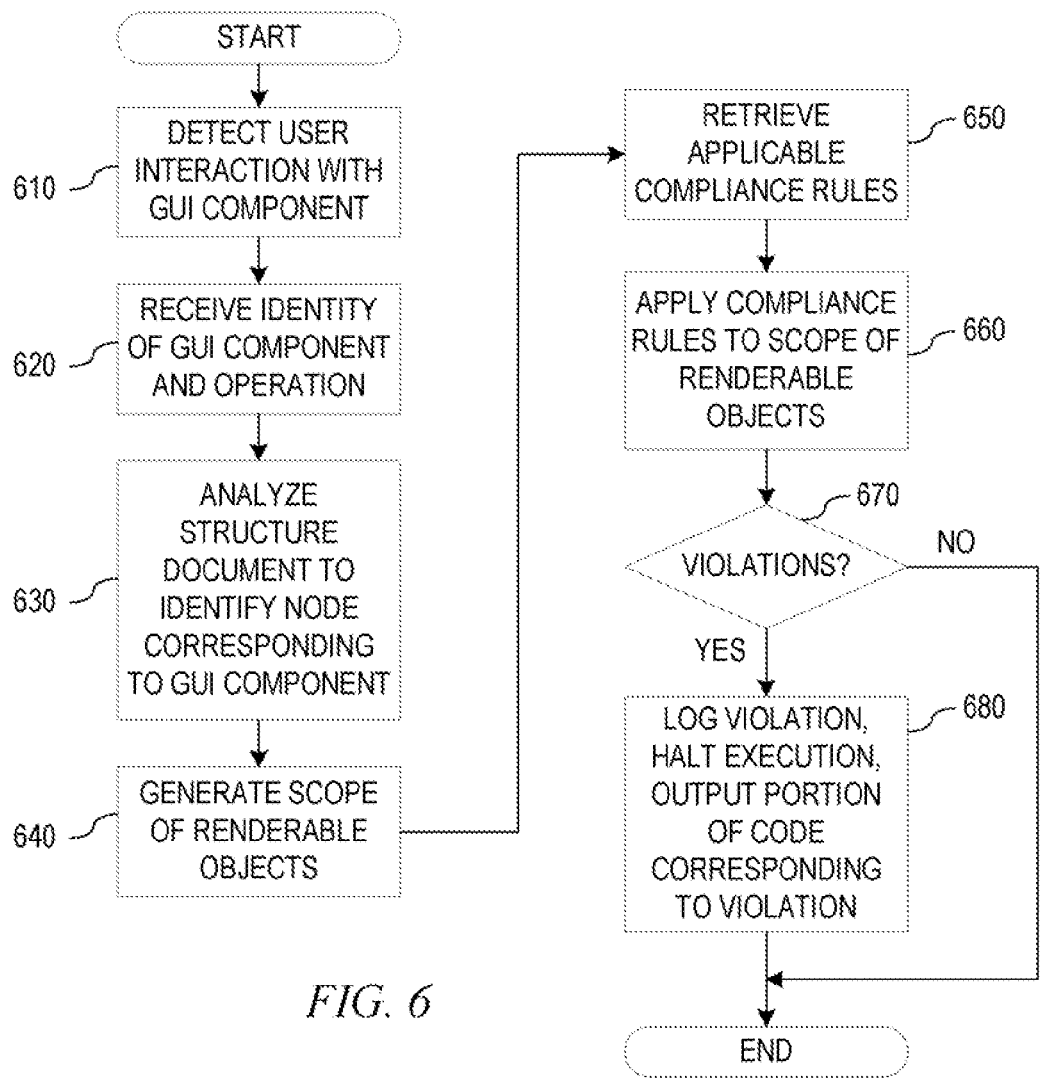
FIG. 6 is a flowchart outlining an example operation of a UI debugger in accordance with one illustrative embodiment.

FIG. 6 is a flowchart outlining an example operation of a UI debugger in accordance with one illustrative embodiment. As shown in FIG. 6, the operation starts with a user interaction with a GUI component/object being detected by a debug agent (step 610). The identity of the GUI component/object and the operation being performed by the user are communicated to the UI debugger (step 620). The UI debugger analyzes a structure document for the source code to identify a node corresponding to the identified GUI component/object (step 630). Then, based on the operation being performed by the user, a set of reachable GUI components/objects is identified (step 640). For example, there may be many possible branches of execution coming out of a node and the particular branch of execution corresponding to the operation performed by the user is selected as the initial pathway of the traversal of the hierarchical structure document. Thereafter, each pathway along that initial path is investigated to identify reachable objects along the pathway.

Based on the set of reachable GUI components/objects, i.e. the scope of renderable objects, compliance rules corresponding to these GUI components/objects are retrieved (step 650) and applied to the scope of renderable objects (step 660). A determination is made as to whether any of the compliance rules are violated (step 670). If so, a log of the violation is generated, execution of the application is halted, i.e. there is a break in the execution, and a portion of code corresponding to the GUI component/object that generated the violation is output (step 680). Otherwise, or thereafter, the operation terminates. It should be appreciated that this operation may be repeated with each new user interaction, or event, of interest such that this operation may be repeated many times while the user is interacting with the executable application's GUI.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for debugging a graphical user interface (GUI) of a computer application code, comprising:
   detecting, by a debug agent running on a computing device associated with the data processing system, a user interaction with a first renderable object of the GUI during execution of the computer application code;
   identifying, by a user interface debugger running on the data processing system, one or more second renderable objects of the GUI that are reachable from the first renderable object based on an identity of the first renderable object and a type of the user interaction;
   applying, by the user interface debugger, one or more compliance rules to the first renderable object and one or more second renderable objects, the compliance rules specifying requirements for at least one relationship between the first renderable object and the one or more second renderable objects; and
   outputting, by the user interface debugger, results of the application of the one or more compliance rules to the first renderable object and one or more second renderable objects, wherein the one or more compliance rules specify a required relationship between the first renderable object and the one or more second renderable objects with regard to operations performed by, and state of, the one or more second renderable objects in response to the type of the user interaction.

2. The method of claim 1, further comprising:
   gathering information regarding the state of the one or more second renderable objects of the GUI from the computer application code using a traditional debugger; and
   applying the one or more compliance rules to the gathered information to verify relationships between the state of the first renderable object and the states of the one or more second renderable objects.

3. The method of claim 1, wherein the method is performed continuously as the user interacts with renderable objects of the GUI such that the method is repeated with each user interaction with a renderable object of the GUI.

4. The method of claim 1, wherein the method is performed repeatedly as the user interacts with the renderable objects of the GUI such that the method is repeated for selected types of user interactions with renderable objects of the GUI.

5. The method of claim 1, further comprising:
performing a dynamic break in the execution of the computer application code in response to a determination that at least one of the one or more compliance rules is violated by a relationship between the first renderable objects and at least one of the one or more second renderable objects.

6. The method of claim 5, further comprising:
displaying a current location in the computer application code at which the computer application code is executing in response to the dynamic break thereby identifying to a user a portion of the computer application code associated with generating the violation of the at least one of the one or more compliance rules.

7. The method of claim 1, wherein outputting results of the application of the one or more compliance rules to the first renderable object and one or more second renderable objects comprises logging violations of the one or more compliance rules in a debugger log data structure.

8. The method of claim 1, wherein identifying one or more second renderable objects of the GUI that are reachable from the first renderable object comprises:
retrieving a structure document for the GUI, wherein the structure document specifies a hierarchy of elements of the GUI and their relationships;
locating an element corresponding to the first renderable object in the structure document; and
based on the type of user interaction, identifying a path through the hierarchy of elements from the element corresponding to the first renderable object to one or more other elements corresponding to the one or more second renderable objects.

9. The method of claim 8, wherein the structure document is one of a document object model (DOM) or an abstract syntax tree (AST).

10. A computer program product comprising a non-transitory computer recordable storage medium having a computer readable program recorded thereon, wherein the computer readable program, when executed on a computing device, causes the computing device to:
detect a user interaction with a first renderable object of a graphical user interface (GUI) during execution of a corresponding computer application code;
identify one or more second renderable objects of the GUI that are reachable from the first renderable object based on an identity of the first renderable object and a type of the user interaction;
apply one or more compliance rules to the first renderable object and one or more second renderable objects, the compliance rules specifying requirements for at least one relationship between the first renderable object and the one or more second renderable objects; and
output results of the application of the one or more compliance rules to the first renderable object and one or more second renderable objects, wherein the one or more compliance rules specify a required relationship between the first renderable object and the one or more second renderable objects with regard to operations performed by, and state of, the one or more second renderable objects in response to the type of the user interaction.

11. The computer program product of claim 10, wherein the computer readable program further causes the computing device to:
gather information regarding the state of the one or more second renderable objects of the GUI from the computer application code using a traditional debugger; and
apply the one or more compliance rules to the gathered information to verify relationships between the state of the first renderable object and the states of the one or more second renderable objects.

12. The computer program product of claim 10, wherein the computer readable program is executed by the computing device continuously as the user interacts with renderable objects of the GUI such that the method is repeated with each user interaction with a renderable object of the GUI.

13. The computer program product of claim 10, wherein the computer readable program is executed by the computing device repeatedly as the user interacts with the renderable objects of the GUI such that the method is repeated for selected types of user interactions with renderable objects of the GUI.

14. The computer program product of claim 10, wherein the computer readable program further causes the computing device to:
perform a dynamic break in the execution of the computer application code in response to a determination that at least one of the one or more compliance rules is violated by a relationship between the first renderable objects and at least one of the one or more second renderable objects.

15. The computer program product of claim 14, wherein the computer readable program further causes the computing device to:
display a current location in the computer application code at which the computer application code is executing in response to the dynamic break thereby identifying to a user a portion of the computer application code associated with generating the violation of the at least one of the one or more compliance rules.

16. The computer program product of claim 10, wherein the computer readable program further causes the computing device to identify one or more second renderable objects of the GUI that are reachable from the first renderable object by:
retrieving a structure document for the GUI, wherein the structure document specifies a hierarchy of elements of the GUI and their relationships;
locating an element corresponding to the first renderable object in the structure document; and
based on the type of user interaction, identifying a path through the hierarchy of elements from the element corresponding to the first renderable object to one or more other elements corresponding to the one or more second renderable objects.

17. The computer program product of claim 16, wherein the structure document is one of a document object model (DOM) or an abstract syntax tree (AST).

18. An apparatus, comprising:
a processor; and
a memory coupled to the processor, wherein the memory comprises instructions which, when executed by the processor, cause the processor to:
detect a user interaction with a first renderable object of a graphical user interface (GUI) during execution of a corresponding computer application code;
identify one or more second renderable objects of the GUI that are reachable from the first renderable object based on an identity of the first renderable object and a type of the user interaction;
apply one or more compliance rules to the first renderable object and one or more second renderable objects, the compliance rules specifying requirements for at least one relationship between the first renderable object and the one or more second renderable objects; and output results of the application of the one or more compliance rules to the first renderable object and one or more second renderable objects, wherein the one or more compliance rules specify a required relationship between the first renderable object and the one or more second renderable objects with regard to operations performed by, and state of, the one or more second renderable objects in response to the type of the user interaction.

* * * * *